United States Patent
Lee et al.

(10) Patent No.: US 9,622,235 B2
(45) Date of Patent: Apr. 11, 2017

(54) METHOD AND APPARATUS FOR RECEIVING CONTROL INFORMATION IN WIRELESS COMMUNICATION SYSTEM

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

(*) Notice: Subject to any disclaimer, the term of this patent is extended or adjusted under 35 U.S.C. 154(b) by 28 days.

(21) Appl. No.: 14/434,637

(22) PCT Filed: Oct. 23, 2013

(86) PCT No.: PCT/KR2013/009473
§ 371 (c)(1),
(2) Date: Apr. 9, 2015

(87) PCT Pub. No.: WO2014/065585
PCT Pub. Date: May 1, 2014

(65) Prior Publication Data
US 2015/0264667 A1    Sep. 17, 2015

Related U.S. Application Data

(60) Provisional application No. 61/717,639, filed on Oct. 23, 2012.

(51) Int. Cl.
*H04W 72/04* (2009.01)
*H04L 5/00* (2006.01)
*H04L 1/00* (2006.01)

(52) U.S. Cl.
CPC ......... *H04W 72/042* (2013.01); *H04L 1/0046* (2013.01); *H04L 5/001* (2013.01);
(Continued)

(58) Field of Classification Search
None
See application file for complete search history.

(56) References Cited

U.S. PATENT DOCUMENTS 8,995,395 B2 * 3/2015 Frenne ............... 370/331
9,167,510 B2 * 10/2015 Fu ..................... H04L 5/00
(Continued)

FOREIGN PATENT DOCUMENTS

KR    10-2011-0134305 A    12/2011

OTHER PUBLICATIONS

Alcatel-Lucent Shanghai Bell et al., "Search Space Design for ePDCCH," 3GPP TSG RAN WG1 Meeting #68bis, R1-121252, Jeju, Korea, Mar. 26-30, 2012, pp. 1-3.
(Continued)

*Primary Examiner* — Hicham Foud
(74) *Attorney, Agent, or Firm* — Birch, Stewart, Kolasch & Birch, LLP

(57) ABSTRACT

A method is provided for receiving control information by a user equipment (UE) in a wireless communication system. The UE receives information on a time-resource region in which common search space (CSS) monitoring on a legacy physical downlink control channel (PDCCH) is performed. The UE further receives monitoring information on a CSS on an enhanced PDCCH (EPDCCH). The UE detects control information according to the monitoring information. If the time-resource region in which the CSS monitoring on the legacy PDCCH is performed is identical to the time-resource region in which CSS monitoring on the EPDCCH is performed, the control information is detected by monitoring a CSS determined according to a transmission mode of the UE.

12 Claims, 8 Drawing Sheets

(52) U.S. Cl.
CPC .......... *H04L 5/0048* (2013.01); *H04L 5/0053* (2013.01); *H04L 5/0055* (2013.01)

(56) References Cited

U.S. PATENT DOCUMENTS

| | | | |
|---|---|---|---|
| 2012/0039283 A1* | 2/2012 | Chen | H04W 72/042 370/329 |
| 2012/0106465 A1* | 5/2012 | Haghighat | H04W 72/1289 370/329 |
| 2012/0300715 A1* | 11/2012 | Pelletier | H04W 56/0005 370/329 |
| 2013/0039284 A1* | 2/2013 | Marinier | H04L 5/001 370/329 |
| 2013/0194956 A1* | 8/2013 | Sartori | H04W 24/02 370/252 |
| 2013/0242750 A1* | 9/2013 | Baker | H04W 72/042 370/241 |
| 2013/0242882 A1* | 9/2013 | Blankenship | H04W 72/042 370/329 |
| 2013/0250874 A1* | 9/2013 | Luo | H04W 72/04 370/329 |
| 2013/0250880 A1* | 9/2013 | Liao | H04W 72/042 370/329 |
| 2013/0252606 A1* | 9/2013 | Nimbalker | H04B 17/309 455/434 |
| 2013/0301542 A1* | 11/2013 | Krishnamurthy | H04W 52/50 370/329 |
| 2013/0301549 A1* | 11/2013 | Chen | H04W 76/048 370/329 |
| 2014/0036747 A1* | 2/2014 | Nory | H04W 72/0406 370/311 |
| 2014/0071934 A1* | 3/2014 | Frenne | H04L 5/001 370/330 |
| 2014/0079000 A1 | 3/2014 | Ko et al. | |
| 2014/0086063 A1* | 3/2014 | Wu | H04W 24/00 370/241 |
| 2014/0293942 A1* | 10/2014 | Kang | H04L 5/0053 370/329 |
| 2014/0328301 A1* | 11/2014 | Kim | H04L 5/0053 370/329 |
| 2015/0003365 A1* | 1/2015 | Seo | H04L 5/0053 370/329 |
| 2015/0146639 A1* | 5/2015 | Seo | H04L 5/0094 370/329 |
| 2015/0230210 A1* | 8/2015 | Lee | H04L 5/0048 370/329 |
| 2016/0065333 A1* | 3/2016 | Blankenship | H04W 72/042 370/329 |

OTHER PUBLICATIONS

LG Electronics, "On the Common Search Space for E-PDCCH-configured UEs," 3GPP TSG RAN WG1 Meeting #68, R1-120451, Dresden, Germany, Feb. 6-10, 2012, pp. 1-4.

Sharp, "Common search space in ePDCCH and fallback operation in Rel-11," 3GPP TSG RAN WG1 Meeting #69, Prague, Czech Republic, May 21-25, 2012, R1-122390, pp. 1-6.

Sharp, "Common search space in ePDCCH," 3GPP TSG RAN WG1 Meeting #68bis, R1-121354, Jeju, Korea, Mar. 26-30, 2012, pp. 1-5.

* cited by examiner

METHOD AND APPARATUS FOR RECEIVING CONTROL INFORMATION IN WIRELESS COMMUNICATION SYSTEM

CROSS REFERENCE TO RELATED APPLICATIONS

This application is the National Phase of PCT International Application No. PCT/KR2013/009473, filed on Oct. 23, 2013, which claims priority under 35 U.S.C. 119(e) to U.S. Provisional Application No. 61/717,639, filed on Oct. 23, 2012, all of which are hereby expressly incorporated by reference into the present application.

TECHNICAL FIELD

The present invention relates to a wireless communication system, and more particularly, to a method of receiving control information in a wireless communication system and an apparatus therefor.

BACKGROUND ART

3GPP LTE ($3^{rd}$ generation partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.44 MHz, 3 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

An object of the present invention is to provide a method of receiving control information in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving control information, which is received by a user equipment in a wireless communication system, includes the steps of receiving monitoring information on a CSS (common search space) on an EPDCCH (enhanced physical downlink control channel) and detecting control information according to the monitoring information.

Preferably, the monitoring information can include an indicator indicating whether a time-resource region exists in the CSS on the EPDCCH.

Preferably, the monitoring information includes information indicating a system version related to the wireless communication system and the control information detecting step can monitor the CSS on the EPDCCH only when the system version corresponds to a predetermined system version.

Preferably, the monitoring information indicates the number of REs (resource elements) usable for transmitting the EPDCCH and the control information detecting step can monitor the CSS on the EPDCCH only when the number of REs is greater than a predetermined number.

Preferably, the method further includes the step of receiving information on a time-resource region in which CSS monitoring on a legacy physical downlink control channel (PDCCH) is performed. If the time-resource region in which the CSS monitoring on the legacy PDCCH is performed is identical to the time-resource region in which CSS monitoring on the EPDCCH is performed, the control information is detected by monitoring a CSS on the legacy PDCCH. More preferably, if the time-resource region in which the CSS monitoring on the legacy PDCCH is perfoitned is identical to the time-resource region in which the CSS monitoring on the EPDCCH is performed, the time-resource region for the CSS monitoring on the EPDCCH can be considered as a misconfigured state.

Preferably, the method further includes the step of receiving information on a time-resource region in which CSS monitoring on a legacy PDCCH is performed. If the time-resource region in which the CSS monitoring on the legacy PDCCH is performed is identical to the time-resource region in which CSS monitoring on the EPDCCH is performed, the control information is detected by monitoring a CSS on the legacy PDCCH in response to a specific RNTI (radio network temporary identifier)-based signal. More preferably, the specific RNTI may correspond to one selected from the group consisting of a P-RNTI (paging-RNTI), a SI-RNTI (system information-RNTI), an M-RNTI (MCCH-RNTI), and an RA-RNTI (random access-RNTI).

Preferably, the method further includes the step of receiving information on a time-resource region in which CSS monitoring on a legacy PDCCH is performed. If the time-resource region in which the CSS monitoring on the legacy PDCCH is performed is identical to the time-resource region in which CSS monitoring on the EPDCCH is performed, the control information is detected by monitoring a CSS on the legacy PDCCH in response to a signal of a specific DCI format.

Preferably, the method further includes the step of receiving information on a time-resource region in which CSS monitoring on a legacy PDCCH is performed. If the time-resource region in which the CSS monitoring on the legacy PDCCH is performed is identical to the time-resource region in which CSS monitoring on the EPDCCH is performed, the control information is detected my monitoring can a CSS determined according to a transmission mode of the user equipment.

Preferably, the monitoring information can further include information on a time-resource region in which both EPDCCH-based CSS monitoring and legacy PDCCH-based CSS monitoring are performed together.

Preferably, the method further includes the step of receiving information on a starting symbol position of a specific EPDCCH set. More preferably, if the starting symbol position of the specific EPDCCH set and a legacy PDCCH region set to the user equipment are overlapped with each other, the control information detecting step can monitor the CSS on the EPDCCH.

Preferably, if blind decoding candidates for a USS (UE-specific search space) on legacy PDCCH and blind decoding candidates for a USS on the EPDCCH are respectively configured and USS monitoring on the legacy PDCCH is omitted, the blind decoding candidates for the USS on the legacy PDCCH can be reallocated to the blind decoding candidates for the USS on the EPDCCH.

To further achieve these and other advantages and in accordance with the purpose of the present invention, according to a different embodiment, a user equipment receiving control information in a wireless communication system includes an RF (radio frequency) unit and a processor, the processor configured to receive monitoring information on a CSS (common search space) on an EPDCCH (enhanced physical downlink control channel), the processor configured to detect control information according to the monitoring information.

Advantageous Effects

According to the present invention, downlink control information of a user equipment can be efficiently detected in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited.

Specific terminologies used in the following description are provided to help understand the present invention and the use of the terminologies can be modified to a different form within a scope of the technical idea of the present invention.

Figure 1:
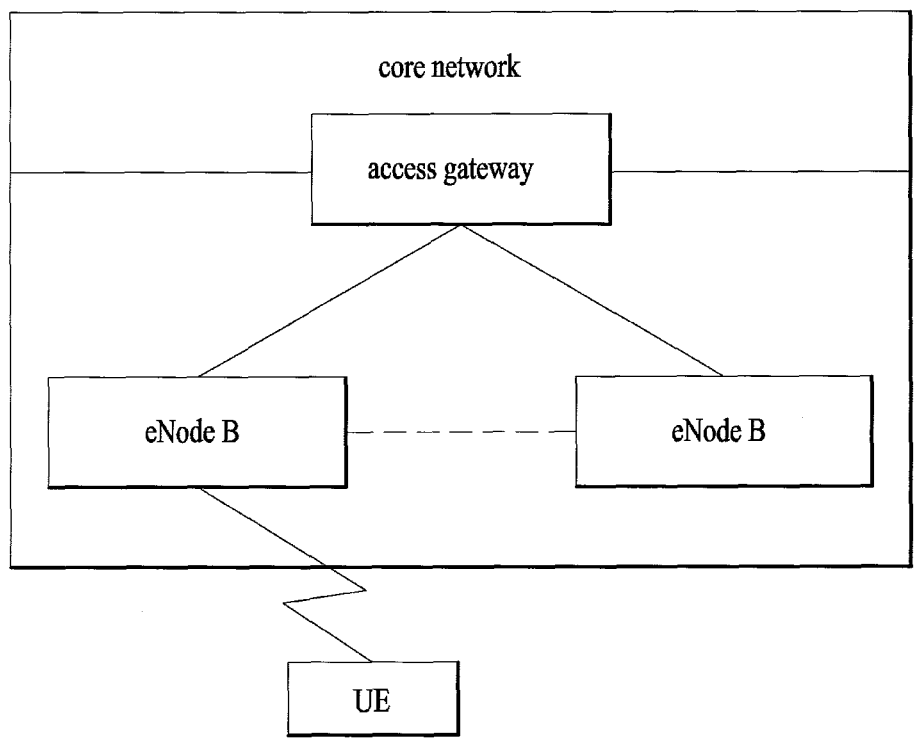
FIG. 1 is a schematic diagram of E-UMTS network structure as one example of a wireless communication system.
Figure 2:
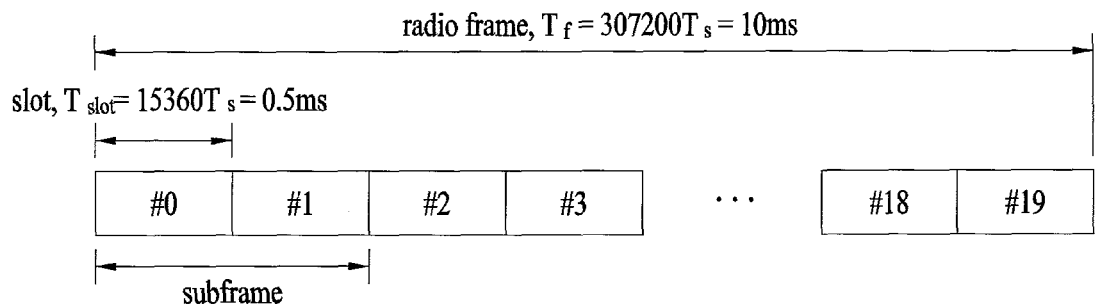
FIG. 2 is a diagram for an example of a radio frame structure in 3GPP system.

FIG. 2 is a diagram for an example of a radio frame structure of 3GPP system.

Referring to FIG. 2, A radio frame includes 10 subframes. Each of the subframes includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols or SC-FDMA (single carrier frequency division multiple access) symbol in time domain. Since 3GPP LTE system uses OFDMA in downlink and SC-FDMA in uplink, OFDM or SC-FDMA symbol indicates one symbol period. Resource block (RB) is a resource allocation unit and may include a plurality of contiguous subcarriers in one slot. The above-described structures of the radio frame are exemplary only. And, the number of subframes included in a radio frame, the number of slots included in the subframe and the number of symbols included in the slot may be modified in various ways.

Figure 3:
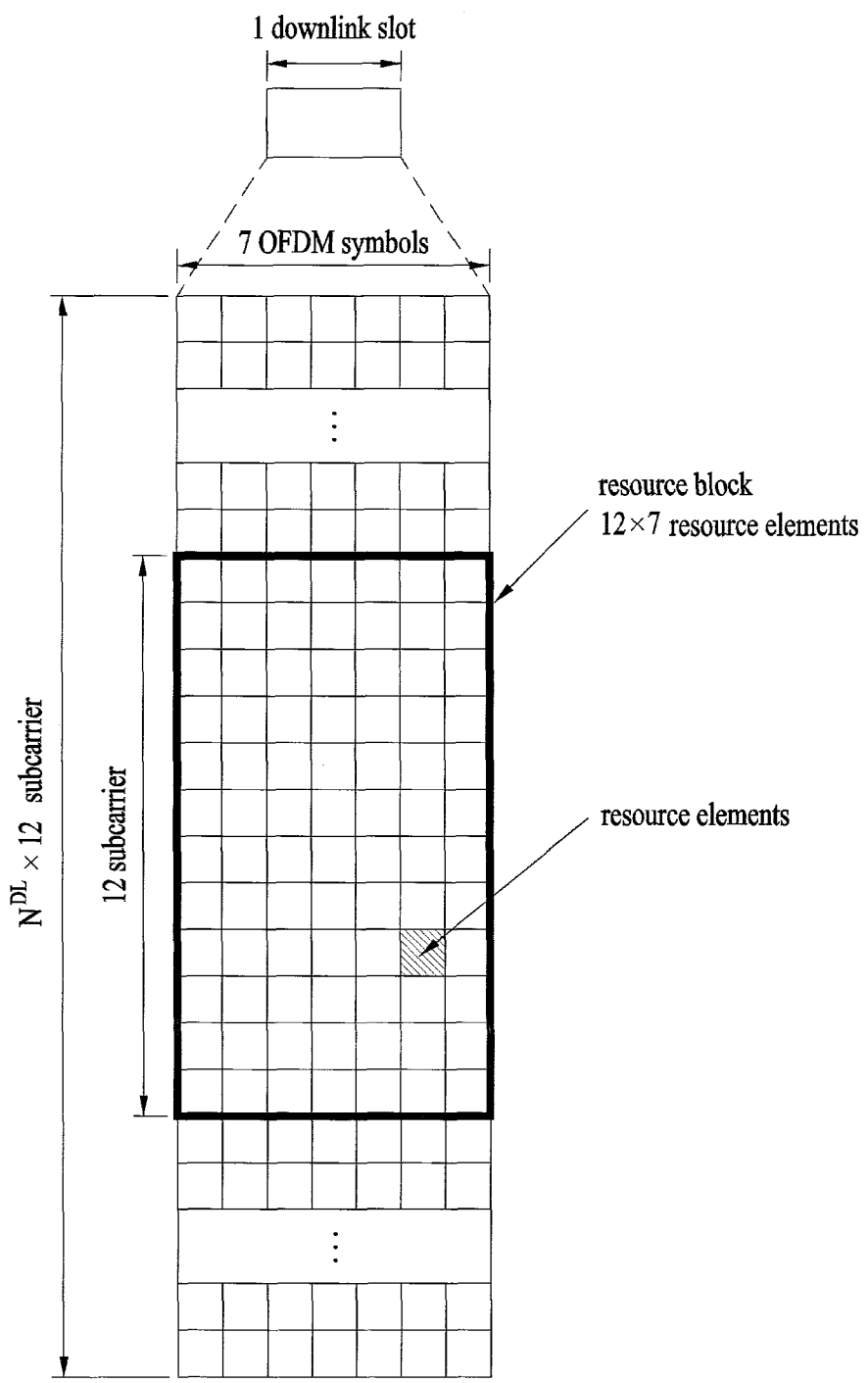
FIG. 3 is a diagram for an example of a resource grid of a downlink slot.

FIG. 3 is a diagram for an example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NDL of resource blocks included in a DL slot may depend on a DL transmission bandwidth. And, the structure of an uplink (UL) slot may be identical to that of the DL slot and OFDM symbol is replaced by SC-FDMA symbol.

Figure 4:
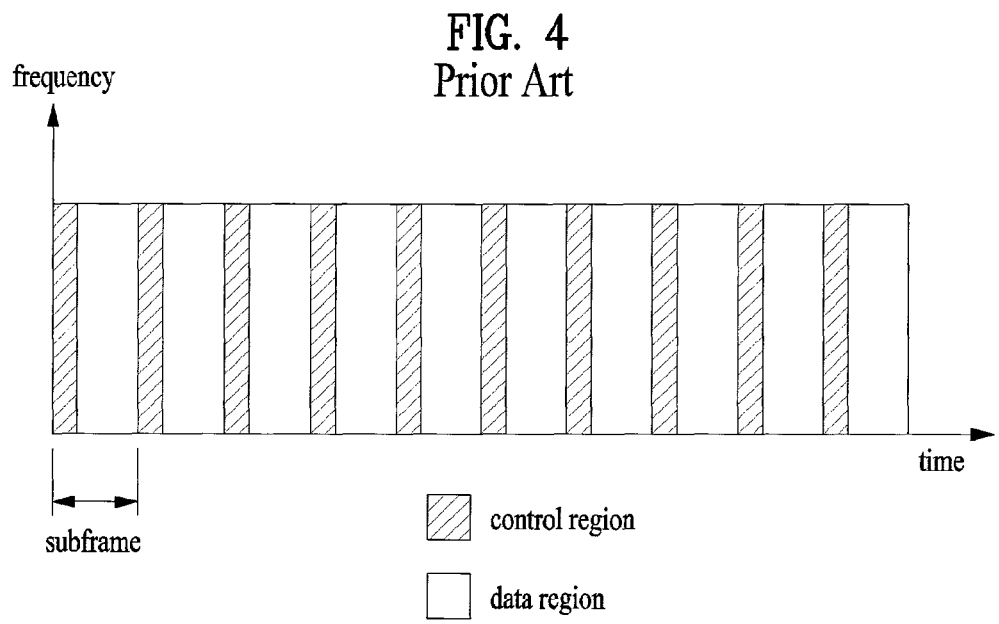
FIG. 4 is a diagram for a downlink frame structure.

FIG. 4 is a diagram for an example of a structure of a downlink subframe.

Referring to FIG. 4, maximum 3 (4) OFDM symbols situated at a fore part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request).

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Control information carried on PDCCH may be called downlink control information (DCI: downlink control indicator). A DCI format is defined by a format of 0, 3, 3A, 4 for an uplink and the DCI format is defined by formats of 1, 1A, 1B, 1C, 1D, 2, 2A, 2B, 2C and the like for a downlink. A type of information field, the number of information field, the number of bit of each information field and the like vary according to a DCI format. For instance, the DCI format may be able to selectively include a hopping flag, an RB assignment, an MCS (modulation coding scheme), an RV (redundancy version), an NDI (new data indicator), a TPC (transmit power control), a HARQ process number, a PMI (precoding matrix indicator) confirmation and the like according to a usage. Hence, a size of control information matched with a DCI format varies according to the DCI format. Meanwhile, an arbitrary DCI format can be used to transmit control information of two or more types. For instance, the DCI format 0/1A is used to carry the DCI format 0 or the DCI format 1. The DCI format 0 and the DCI format 1 are distinguished by a flag field.

PDCCH carries a transmission format and resource allocation information of DL-SCH (downlink shared channel), a transmission format and resource allocation information of UL-SCH (uplink shared channel), paging information on a PCH (paging channel), system information on a DL-SCH, resource allocation information of an upper layer control message such as a random access response transmitted on PDSCH, a transmit power control command set for an individual user equipments within a random user equipment (UE) group, information on activation indication of VoIP (voice over IP), and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined according to correlation between the number of CCEs and a code rate provided by the CCE. A base station determines a PDCCH format in accordance with DCI to be transmitted to a user equipment and attaches a CRC (cyclic redundancy check) to control information. The CRC is masked with a unique identifier (e.g., RNTI (radio network temporary identifier)) in accordance with an owner or usage of PDCCH. If PDCCH is provided for a specific user equipment, the CRC can be masked with a unique identifier of the corresponding user equipment, i.e., C-RNTI (i.e., Cell-RNTI). If PDCCH is provided for a paging message, the CRC can be masked with a paging identifier (e.g., P-RNTI (Paging-RNTI)). If PDCCH is provided for system information, and more particularly, for a system information block (SIB), the CRC can be masked with a system information identifier (e.g., SI-RNTI (system information-RNTI). If PDCCH is provided for a random access response, the CRC can be masked with RA-RNTI (random access-RNTI).

PDCCH carries a message known as a DCI (downlink control information) and the DCI includes resource allocation information for a UE or a UE group and different control information. In general, a plurality of PDCCHs can be transmitted in a subframe. Each of a plurality of the PDCCHs is transmitted using one or more CCEs (control channel element). In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary depending on whether a cell-specific reference signal exists. The concept of REG for mapping 4 resource elements to one group may apply to other DL control channels (e.g., PCFICH, PHICH, etc.). In particular, the REG is used as a basic resource unit of the control region. Table 1 shows PDCCH format, in which 4 kinds of PDCCH formats are supported.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are contiguously used in a manner of being indexed. In order to simplify a decoding process, PDCCH including a format configured with n CCEs may start with CCE having an index equal to the multiple of n. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of PDCCH provided for a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. One PDCCH candidate corresponds to 1, 2, 4, or 8 CCEs according to a CCE aggregation level. A base station transmits an actual PDCCH (DCI) via an arbitrary PDCCH candidate within the SS and a user equipment monitors the SS to find out the PDCCH (DCI). Specifically, the user equipment attempts a blind decoding (BD) for PDCCH candidates within the SS.

In LTE system, the SS may have a different size in accordance with each PDCCH format. And, a USS (UE-specific search space) and a CSS (common search space) are separately defined. The USS is also called a dedicated search space. The UE-specific search space may be individually set for each of user equipments and a range of the common search space is known to all user equipments. The UE-specific and the common search space can be overlapped for a given user equipment. If all CCEs are already allocated to different user equipments in the USS, which is configured for a specific UE, since there is no remaining CCE, a base station may not find out CCE resources enough to transmit PDCCH to the specific user equipment in a given subframe. In order to minimize this blocking that may be kept in a next subframe, a start point of the UE-specific search space is modified by a UE-specific hopping sequence in every subframe. Table 2 shows sizes of a common search space and a UE-specific search space.

TABLE 2

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding (BD) attempt count, the user equipment does not perform searches in accordance with all the defined DCI formats at the same time. In general, the user equipment always searches a UE-search space for DCI format 0 and DCI format 1A. The DCI format 0 and the DCI format 1A are equal to each other in size and may be identified by a flag included in a message. And, the user equipment may be requested to receive an additional format, e.g., format 1, 1B, or 2 according to the PDSCH transmission mode set by a base station. The user equipment may be able to search a common search space for DCI format 1A and DCI format 1C. The user equipment may be configured to search DCI format 3 or DCI format 3A. Similar to the DCI format 0 and the DCI format 1A, the DCI format 3 and the DCI format 3A are equal to each other in size and the user equipment may be able to identify a DCI format using CRC scrambled by different identifiers (common identifier). A transmission mode to configure multi-antenna technology and content of DCI formats are described in the following.

Figure 5:
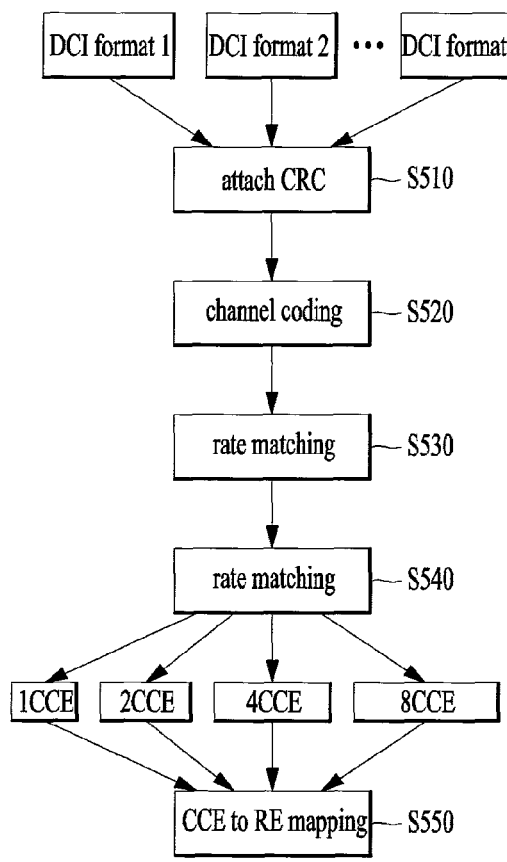
FIG. 5 is a flowchart for PDCCH (physical downlink control channel) configuration in a base station.
Figure 6:
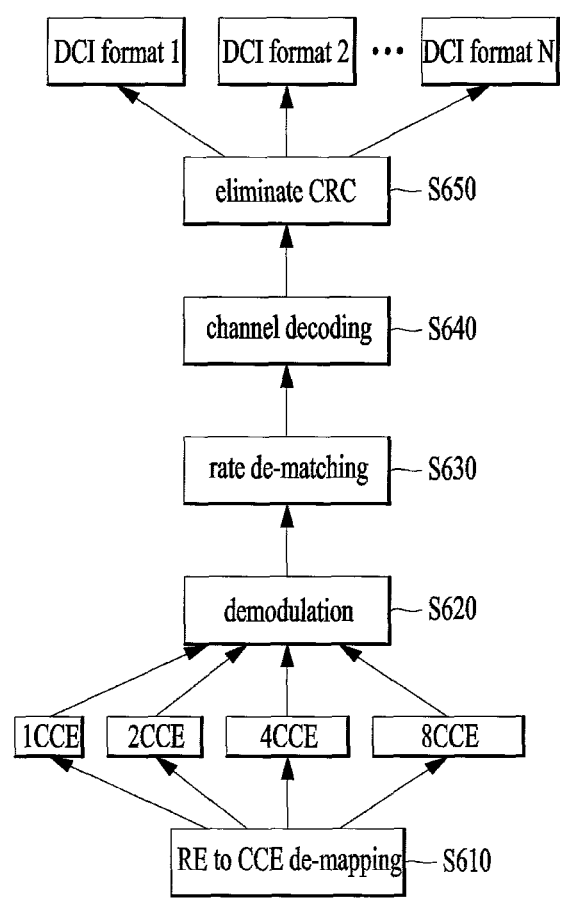
FIG. 6 is a flowchart for an example of a process of receiving PDCCH in a user equipment.

Transmission Mode (TM)
  Transmission mode 1: transmission from a single base station antenna port
  Transmission mode 2: transmit diversity
  Transmission mode 3: open-loop spatial multiplexing
  Transmission mode 4: closed-loop spatial multiplexing
  Transmission mode 5: multi-user MIMO
  Transmission mode 6: closed-loop rank-1 precoding
  Transmission mode 7: transmission using UE-specific reference signals DCI Format
  Format 0: resource grants for the PUSCH transmissions (uplink)
  Format 1: resource assignments for single codeword PDSCH transissions (transmission modes 1, 2 and 7)
  Format 1A: compact signaling of resource assignments for single codeword PDSCH (all modes)
  Format 1B: compact resource assignments for PDSCH using rank-1 closed loop precoding (mode 6)
  Format 1C: very compact resource assignments for PDSCH (e.g. paging/broadcast system information)
  Format 1D: compact resource assignments for PDSCH using multi-user MIMO (mode 5)
  Format 2: resource assignments for PDSCH for closed-loop MIMO operation (mode 4)
  Format 2A: resource assignments for PDSCH for open-loop MIMO operation (mode 3)
  Format 3/3A: power control commands for PUCCH and PUSCH with 2-bit/1-bit power adjustment FIG. 5 is a flowchart of PDCCH (physical downlink control channel) configuration performed by a base station.

Referring to FIG. 5, a base station generates control information according to a DCI format. The base station may be able to select one DCI format among a plurality of DCI formats (DCI format 1, 2, . . . , N) according to the control information to be transmitted to a user equipment. A CRC (cyclic redundancy check) used for detecting an error is attached to the control information generated according to each of the DCI formats [S410]. The CRC is masked with an identifier (e.g., RNTI (radio network temporary identifier)) in accordance with an owner or usage of PDCCH. In other word, PDCCH is CRC scrambled with the identifier (e.g., RNTI).

Table 3 shows an example of identifiers masked to PDCCH.

TABLE 3

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In case that a C-RNTI, a temporary C-RNTI, or a semi-persistent C-RNTI is used, PDCCH carries control information for corresponding specific user equipment. In case that the rest of RNTI is used, the PDCCH carries common control information by which all user equipments within a cell receive. A base station creates a coded data (codeword) by performing a channel coding on the CRC attached control information [S420]. The base station performs a rate matching in accordance with a CCE aggregation level assigned to a PDCCH format [S430] and generates modulated symbols by modulating the coded data [S440]. The modulated symbols configuring one PDCCH may have a CCE aggregation level set to one of 1, 2, 4 and 8. Thereafter, the base station maps the modulated symbols to physical resource elements (RE), i.e., CCE to RE mapping [S450].

FIG. 5 is a flowchart for explaining an example of PDCCH processing process of a user equipment.

Referring to FIG. 5, a user equipments de-maps a physical resource element to CCE, i.e., RE to CCE demapping [S510]. Since the user equipment does not know which CCE aggregation level should be used to receive PDCCH, the user equipment demodulates each of the CCE aggregation levels [S520]. The user equipment performs a rate dematching in accordance with the demodulated data. Since the user equipment does not know which DCI format (or DCI payload size)-having control information should be received, the user equipment performs a rate de-matching in accordance with each of the DCI formats (or DCI payload size) [S530]. The user equipment performs a channel decoding on the de-matched data according to a code rate, checks a CRC, and then detects whether there is an error [S540]. If an error does not occur, it indicates that the user equipment has found out the PDCCH for its own. If an error occurs, the user equipment continuously performs a blind decoding on a different CCE aggregation level or a different DCI format (or DCI payload size). The user equipment, which has found out the PDCCH of its own, eliminates the CRC from the decoded data and then obtains control information.

A plurality of PDCCHs for a plurality of user equipments can be transmitted within a control region of an identical subframe. A base station does not provide information on where a corresponding PDCCH is situated within the control region to the user equipment. Hence, the user equipment searches the subframe for PDCCH for its own in a manner of monitoring a set of PDCCH candidates. In this case, the verb 'monitor' means that the user equipment attempts to decode each of the received PDCCH candidates in accordance with each of the PDCCH formats and each of the CCE aggregation levels. This is called a blind decoding (blind detection). By using the blind decoding, the user equipment simultaneously performs an identification of the PDCCH transmitted to the user equipment and a decoding of the control information transmitted on a corresponding PDCCH. For instance, if the PDCCH is de-masked with C-RNTI, if an error does not occur, it indicates that the user equipment has found out the PDCCH of its own.

Meanwhile, in order to reduce an overhead of blind decoding, the number of DCI formats is defined less than a kind of the control information transmitted on a PDCCH. The DCI format includes a plurality of information fields different from each other. According to the DCI format, a kind of the information field, the number of the information field, a bit number of each of the information fields and the like may vary. In particular, a size of the control information, which is matched with the DCI format, may vary according to the DCI format. A random DCI format can be used for transmitting 2 or more kinds of the control information.

Table 4 shows an example of control information transmitted by a DCI format 0. Bit size of each information field is just an exemplary and does not limit the bit size of each field.

TABLE 4

| Information Field | bit(s) |
|---|---|
| (1) Flag for format0/format1A differentiation | 1 |
| (2) Hopping flag | 1 |
| (3) Resource block assignment and hopping resource Allocation | $\lceil \log_2(N_{RB}^{UL}(N_{RB}^{UL} + 1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

The flag field is an information filed for distinguishing the DCI format 0 and the DCI format 1. In particular, the DCI format 0 and the DCI format 1A have a same payload size and are categorized by the flag field. A resource block assignment and hopping resource allocation field may have a different bit size in accordance with a hopping PUSCH or a non-hopping PUSCH. The resource block assignment and hopping resource allocation field for the non-hopping PUSCH provides ceiling[log 2(NULRB(NULRB+1)/2)] bit to allocate a resource to a first slot in an uplink subframe. In this case, NULRB indicates the number of resource blocks included in an uplink slot and depends on an uplink transmission bandwidth configured in a cell. Hence, a payload size of the DCI format 0 may vary according to the uplink bandwidth. The DCI format 1A includes an information field necessary for PDSCH assignment and a payload size of the DCI format 1A may also vary according to a downlink bandwidth. The DCI format 1A provides the DCI format 0 with a reference information bit size. Hence, if the number of information bits of the DCI format 0 is smaller than the number of information bits of the DCI format 1A, '0' is attached to the DCI format 0 until the payload size of the DCI format 0 becomes identical to the payload size of the DCI format 1A. A padding field of the DCI format is filled with the attached '0'.

Figure 7:
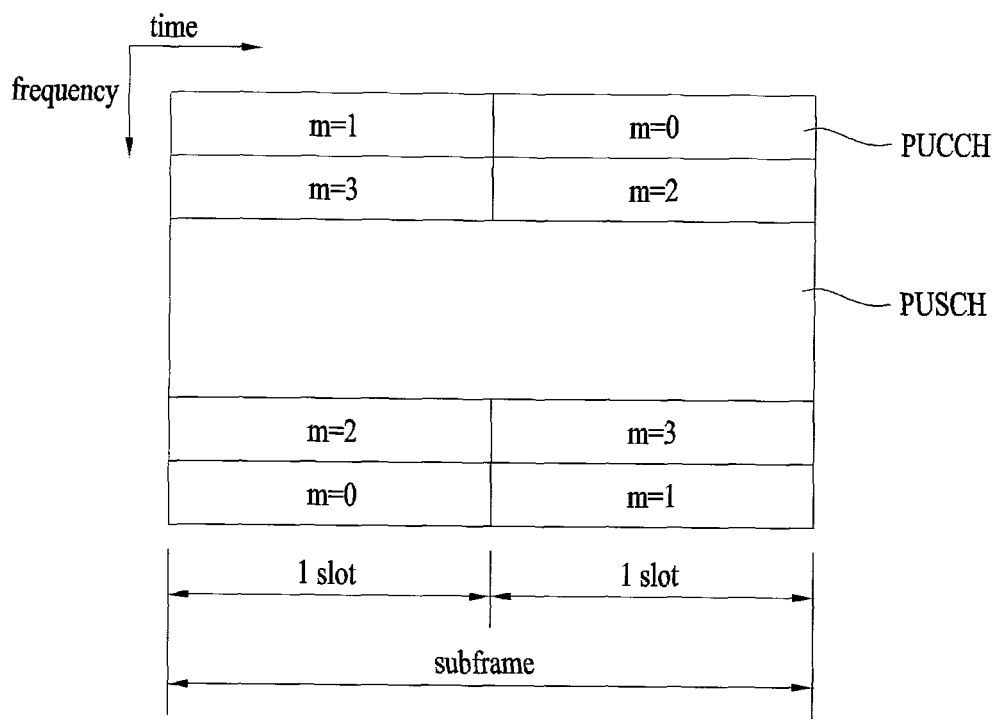
FIG. 7 is a diagram for an example of an uplink subframe structure.

FIG. 7 is a diagram for a structure of an uplink subframe.

Referring to FIG. 7, an uplink subframe includes a plurality of slots (e.g., 2 slots). A slot may include a different number of SC-FDMA symbols according to a length of CP.

As one example, in case of a normal CP, a slot may include 7 SC-FDMA symbols. A UL subframe may be divided into a control region and a data region in frequency domain. The data region includes PUSCH and can be used for transmitting a data signal such as an audio and the like. The control region includes PUCCH and can be used for transmitting control information. The PUCCH includes a RB pair (e.g., m=0, 1, 2, 3) situated at the both ends of the data region and hops on a slot boundary. The control information includes a HARQ-ACK/NACK, a CQI (Channel Quality Information), a PMI (Precoding Matrix Indicator), an RI (Rank Indication), and the like.

Figure 8:
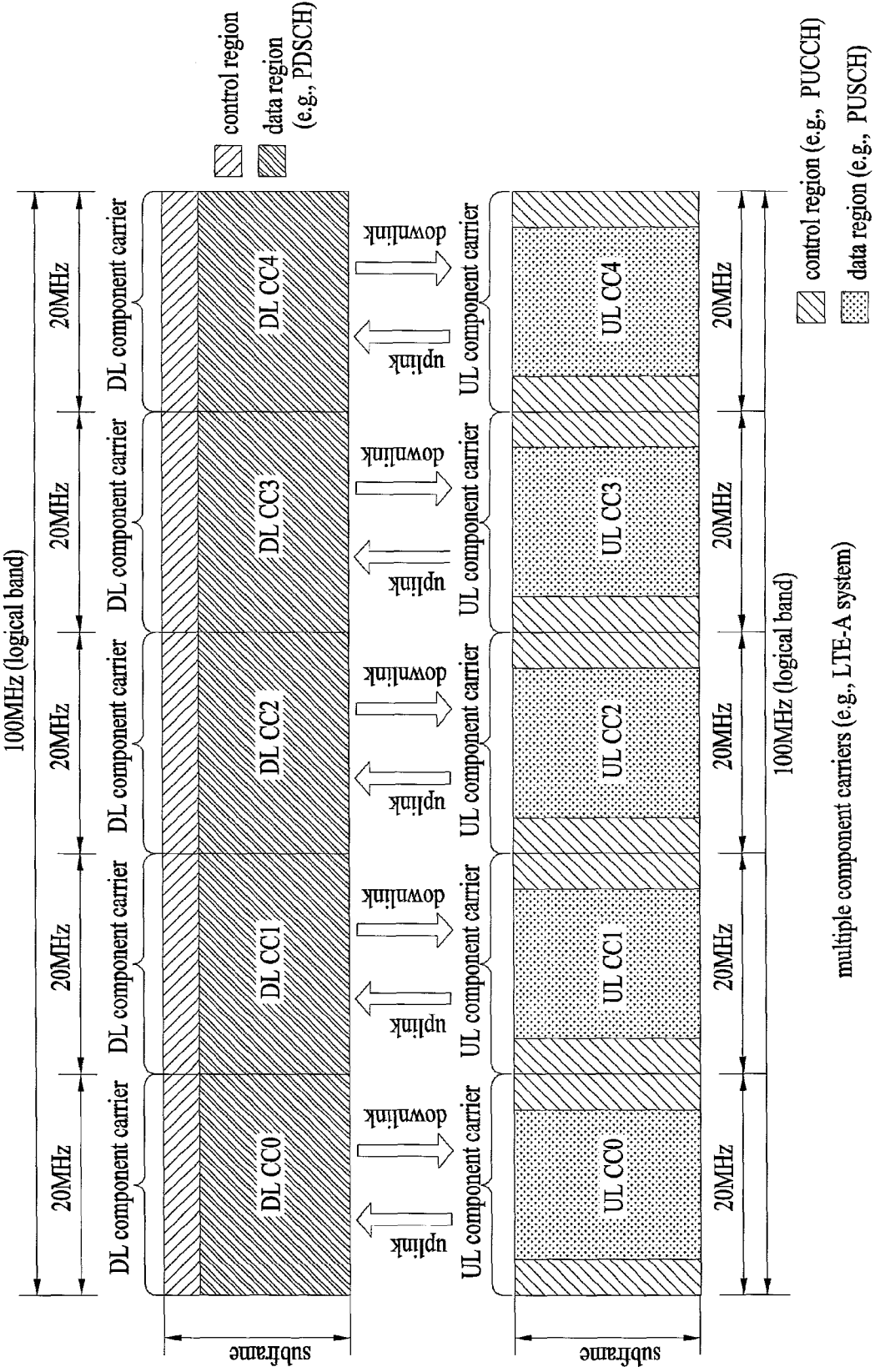
FIG. 8 is a diagram for an example of a CA (carrier aggregation) communication system.

FIG. 8 is a diagram for explaining an example of a carrier aggregation (CA) communication system.

Referring to FIG. 8, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As one example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, a CIF (carrier indicator field) can be used. Whether a CIF exists or not within a PDCCH can be semi-statically and user-specifically (or user group-specifically) configured via an upper layer signaling (e.g., RRC signaling). Basics of PDCCH transmission can be summarized as follows.

CIF disabled: PDCCH on DL CC allocates a PDSCH resource on the same DL CC or a PUSCH resource on a singly linked UL CC.
No CIF
Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.
Expanded LTE DCI format including a CIF
CIF (if configured) is a stationary x-bit field (e.g., x=3)
CIF (if configured) position is fixed irrespective of a DCI format size
Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically.

The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 9:
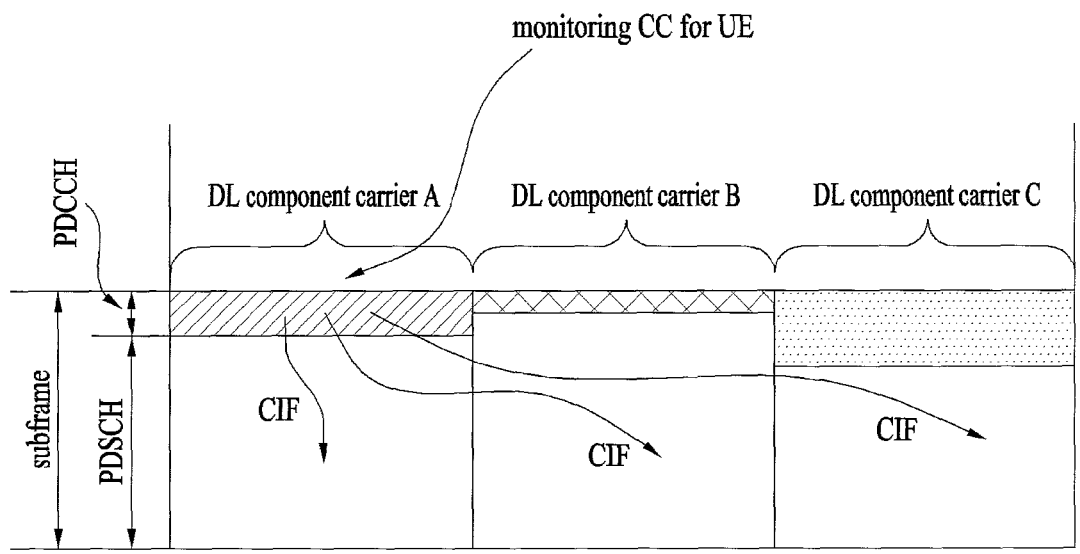
FIG. 9 is a diagram for an example of scheduling when a plurality of carriers are aggregated with each other.

FIG. 9 is a diagram for an example of a scheduling in case that a plurality of carriers are aggregated. Assume that 3 DL CCs are aggregated and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE-group-specific or cell specific) upper layer signaling, only the DL CC A (monitoring DL CC) may be able to transmit the PDCCH, which schedules the PDSCH of a different DL CC as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 10:
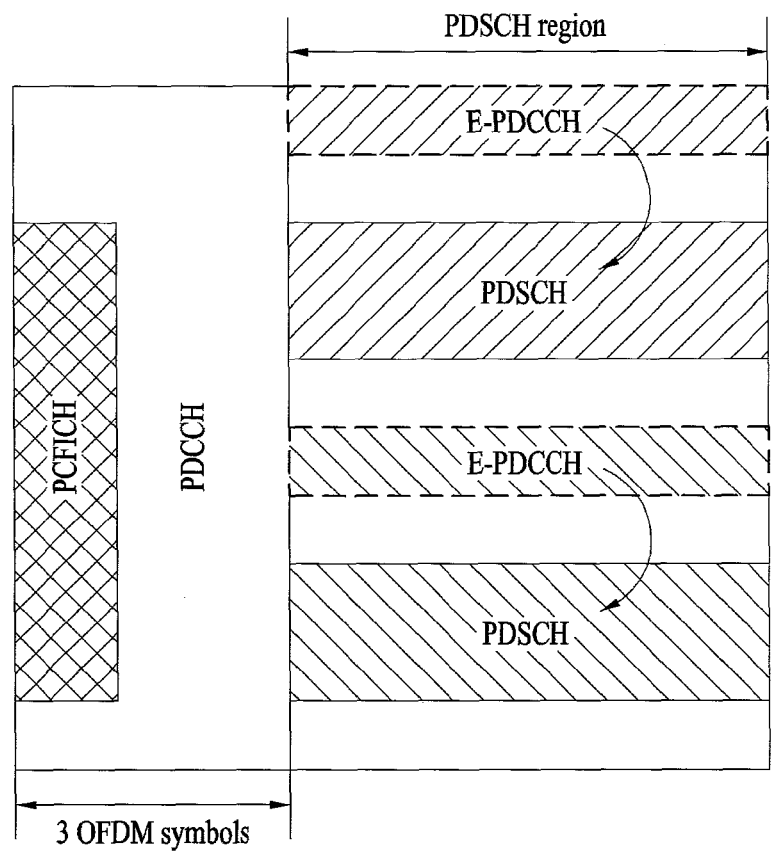
FIG. 10 is a diagram for an example of PDSCH scheduled by EPDCCH and EPDCCH.

FIG. 10 is a diagram for an example of PDSCH scheduled by EPDCCH and EPDCCH.

Referring to FIG. 10, in general, EPDCCH can be used in a manner of defining a part of a PDSCH region transmitting data and a UE should perform blind decoding to detect whether the UE detects EPDCCH of the UE. Although EPDCCH performs a scheduling operation (i.e., PDSCH, PUSCH control) identical to a scheduling operation of a legacy PDCCH, if the number of UEs accessing such a node as an RRH is increasing, the greater numbers of EPDCCHs are assigned to a PDSCH region and the count of blind decoding performed by a UE is increasing. Hence, there may exist a demerit in that complexity may increase.

In the following, the present invention is explained based on the aforementioned description. The present invention proposes a method for a UE to efficiently monitor an EPDCCH-based common search space (CSS) in environment in which EPDCCH (enhanced PDCCH) corresponding to a control channel transmitted in a legacy PDSCH region is used instead of a legacy PDCCH.

In the present invention, a PDSCH region is defined by a region consisting of remaining OFDM symbols except initial partial OFDM symbols used for transmitting a (legacy) PDCCH in a subframe (SF) consisting of a plurality of OFDM symbols. And, if the OFDM symbol used for transmitting PDCCH does not exist, all OFDM symbols of a corresponding subframe (SF) can be designated and used as the PDSCH region. And, it is apparent that EPDCCH described in the following can be used for not only a general user equipment but also a relay to perform communication with a base station.

In the present invention, for clarity, a basic unit of a resource constructing EPDCCH is defined as ECCE. It is defined as each ECCE is constructed by the predetermined number of resource elements (REs). And, if the number of ECCE used for transmitting a specific EPDCCH corresponds to N, it is represented as aggregation level (AL) N.

In the following, for clarity, the proposed scheme is explained based on 3GPP LTE system. Yet, a range of a system to which the proposed scheme is applied can be extended to a system of a different characteristic except the 3GPP LTE system.

Moreover, in order to reliably transmit and receive EPDCCH, at least one of the number of ECCE used for transmitting a specific EPDCCH (i.e., aggregation level (AL) change) and the number of REs constructing a single ECCE may change according to a channel state change between a base station and a user equipment and the number of resource elements (REs) usable for transmitting EPDCCH on a specific PRB pair. In this case, if a coding rate for EPDCCH transmission is properly changed according to a situation change, reliable EPDCCH transmission can be performed.

For instance, when a channel state is not good, if the relatively greater number of ECCEs (i.e., relatively higher aggregation level) are used for transmitting EPDCCH, EPDCCH coding rate can be relatively reduced. Or, if the coding rate used for transmitting EDPCCH is appropriately maintained irrespective of a situation change, it may be able to perform reliable EPDCCH transmission. In particular, if the number of resource elements (REs) usable for transmitting EPDCCH on a specific PRB pair is less than a predetermined threshold value (i.e., $X_{\_th}$), it may be able to maintain an EPDCCH coding rate of an appropriate level by using the relatively greater number of ECCEs (i.e., relatively higher aggregation level) for EPDCCH transmission.

And, in case of a legacy PDCCH, the number of EPDCCH candidates according to an aggregation level (AL) in which a UE performs a blind decoding (BD) operation in a search space (SS) (e.g., In case of a UE-specific SS (USS), the count of performing blind decoding according to an aggregation level {1, 2, 4 and 8} is respectively defined as {6, 6, 2 and 2}. In case of a common search space (CSS), the count of performing blind decoding according to an aggregation level {4, 8} is respectively defined as {4, 2}) or the maximum number of EPDCCH candidates can be defined in advance. In this case, a UE performs blind decoding for the number of EPDCCH candidates, which is defined according to an aggregation level in the CSS/USS, and may be then able to receive specific transmission mode-based (TM or fallback TM) control information (e.g., a TM-specific DCI format or a fallback DCI format) from a base station.

Hence, the present invention proposes a method for a base station to efficiently inform a UE of information on a resource (e.g., time resource and/or frequency resource) position in which EPDCCH-based CSS monitoring is performed. According the method proposed by the present invention, the base station can obtain an efficient load distribution effect of control information between a legacy PDCCH-based CSS and an EPDCCH-based CSS.

Moreover, the present invention can be applied not only to a case that an EPDCCH transmission type (e.g., a localized EPDCCH (L-EPDCCH) or a distributed EPDCCH (D-EPDCCH)) or the number of resource elements (REs) usable for transmitting EPDCCH on a specific PRB pair is greater than a predetermined threshold value ($X_{\_th}$) but also to a case that the number of resource elements (REs) usable for transmitting EPDCCH on the specific PRB pair is less than the predetermined threshold value ($X_{\_th}$).

And, the method proposed by the present invention can be applied not only to a case that environment to which at least one or more EPDCCH sets (in this case, a specific EPDCCH set can consist of a predetermined one or a plurality of PRB pairs) are set to transmit EPDCCH or configuration of aggregation levels (AL) configured according to an EPDCCH set is identical to each other, but also to a case that configuration of aggregation levels (AL) configured according to an EPDCCH set is different from each other.

And, the present invention can also be applied to a case that a plurality of EPDCCH sets are interlocked with cells (or component carriers different from each other) in environment to which CA (carrier aggregation) technique is applied, a case that a plurality of the EPDCCH sets exist in cells (or component carriers) different from each other, a case that an EPDCCH-based CCS (cross carrier scheduling) method is applied in a pre-designated scheduling cell (or a scheduling component carrier), or a case that a PDCCH-based CCS (cross carrier scheduling) method is applied in a pre-designated scheduling cell (or a scheduling component carrier).

And, methods proposed by the present invention can also be applied to all cases that EPDCCH CSS/USS-based communication is performed in environment in which a NCT (new carrier type) is used by a carrier aggregation technique together with a legacy cell or a legacy component carrier (CC) backward compatible with a legacy system or environment in which the NCT is independently used without a (downlink) legacy cell or a legacy component carrier (e.g., environment requiring an NCT-based initial access operation).

Figure 11:
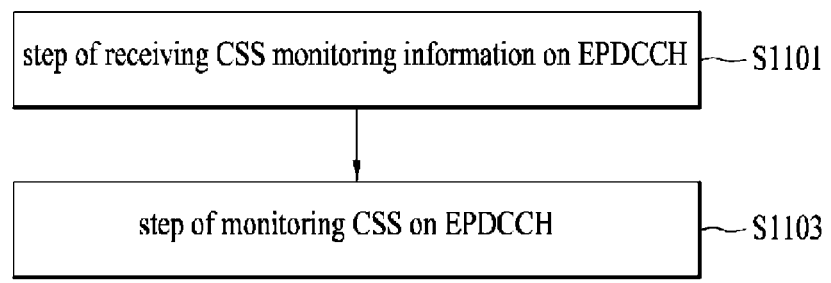
FIG. 11 is a flowchart for a method of detecting control information according to one embodiment of the present invention.

FIG. 11 is a flowchart for a method of detecting control information according to one embodiment of the present invention.

According to the present invention, a base station can inform a UE of information on a time-resource position in which EPDCCH-based CSS monitoring is performed via a predetermined signal (e.g., an upper layer or a physical layer signal) [ S1101].

The UE can detect control information in a manner of monitoring (or blind decoding) a CSS based on the monitoring information received from the base station [S1103].

As an embodiment of the present invention, the information (or signal) on the time-resource position in which the EPDCCH-based CSS monitoring is performed can be defined in a manner of being independent of information (or signal) on a time-resource position in which EPDCCH-based USS monitoring is performed, is implemented in a form of specific information (or signal) of a subset for the time-resource position in which the EPDCCH-based USS monitoring is performed, or is implemented in a form of specific information (or signal) of an upper set including the time-resource position in which the EPDCCH-based USS monitoring is performed. Or, when a time-resource position (e.g., a subframe pattern) in which the EPDCCH-based USS monitoring is performed is configured by transmission of a predetermined signal (e.g., an upper layer/physical layer signal configured by a predetermined bitmap of a prescribed length), if an additionally defined indicator (e.g., 1 bit) is transmitted together with the information on the time-resource position in which the EPDCCH-based USS monitoring is performed (via a predetermined signal), the base station can inform the UE of whether a CSS (monitored by the UE) exists in a legacy PDCCH region or an EPDCCH region in subframes in which the EPDCCH-based USS monitoring is performed. Of course, if the additionally defined indicator is transmitted irrespective of the information on the time-resource position in which the EPDCCH-based USS monitoring is performed, the base station can inform the UE of whether a CSS monitored by the UE exists in a legacy PDCCH region or an EPDCCH region in subframes in which the EPDCCH-based USS monitoring is performed. Specifically, if the aforementioned (additionally defined) indicator (e.g., 1 bit) is set to '1', it may be able to assume that the CSS exists in the EPDCCH region in the subframes in which the EPDCCH-based USS monitoring is performed. On the contrary, if the aforementioned indicator (e.g., 1 bit) is set to '0', it may be able to assume that the CSS exists in the legacy PDCCH region in the subframes in which the EPDCCH-based USS monitoring is performed.

As a different embodiment of the present invention, a time-resource position in which EPDCCH-based CSS monitoring is performed can be configured to be considered as a position identical to a time-resource position in which EPDCCH based USS monitoring is performed based on a predetermined rule without additional signaling for transmitting corresponding information, a form of a subset of the time-resource position in which the EPDCCH-based USS monitoring is performed based on a predetermined rule, or a form of a superset of the time-resource position in which the EPDCCH-based USS monitoring is performed based on a predetermined rule. For instance, it is able to additionally configure that a UE applies an operation of considering the time-resource position in which the EPDCCH-based USS monitoring is performed only when a signal used for notifying a time-resource in which the EPDCCH-based USS monitoring is performed defined in a system of an updated version (e.g., Rel-11) is received instead of a signal used for notifying a time-resource in which the EPDCCH-based USS monitoring is performed defined in a system of a legacy system (e.g., Rel-10).

Specifically, if the signal used for notifying the time-resource in which the EPDCCH-based USS monitoring is performed defined in the legacy system (e.g., Rel-10) is received, a base station and a UE can assume that the EPDCCH-based USS monitoring is performed only in the corresponding information (i.e., received signal)-based subframes. On the contrary, if the signal used for notifying the time-resource in which the EPDCCH-based USS monitoring is performed defined in the system of the updated version (e.g., Rel-11) is received, the base station and the UE can implicitly assume that both the EPDCCH-based USS monitoring and EPDCCH-based CSS monitoring are performed in the corresponding information (i.e., received signal)-based subframes. Or, the base station and the UE can assume that the EPDCCH-based CSS monitoring is performed together with the EPDCCH-based USS monitoring in a form of a subset of the time-resource position in which the EPDCCH-based USS monitoring is performed.

Or, if timing of performing the EPDCCH-based CSS monitoring and timing of performing the EPDCCH-based USS monitoring are overlapped with each other, a specific DCI format type (e.g., a DCI format 1A) is transmitted in an EPDCCH-based CSS according to a predetermined rule. Or, a predetermined different (or the rest of) specific DCI format type can be configured to be transmitted in an EPDCCH-based USS. For instance, a base station can inform a UE of information on the DCI format types transmitted in the EPDCCH-based CSS or the EPDCCH-based USS via a predetermined signal (e.g., an upper layer or a physical layer signal). Or, the information on the DCI format types can be configured to be determined based on an implicit rule (shared with each other between the base station and the UE in advance).

And, it is able to configure that a UE implicitly performs legacy PDCCH-based CSS monitoring according to a predetermined rule or a legacy system (e.g., legacy Rel-10) operation in (remaining) time-resource positions, which are not selected as the time-resource position in which the EPDCCH-based CSS monitoring is performed, via a predetermined signal (e.g., an upper layer or a physical layer signal).

As a further different embodiment of the present invention, it is able to exceptionally configure legacy PDCCH-based CSS monitoring to be performed in a predetermined specific subframe type (or timing). In this case, for instance, when a special subframe is configured as a special subframe configuration #0 or a special subframe configuration #5 in TDD system environment to which a normal CP (cyclic prefix) is applied, or when a special subframe is configured as a special subframe configuration #0 or a special subframe configuration #4 in TDD system environment to which an extended CP is applied, since it is very difficult to configure a search space (SS) in the corresponding special subframe since the number of resource elements (REs) usable for transmitting EPDCCH (on a specific PRB pair) is not sufficient, it is able to exceptionally configure the legacy PDCCH-based CSS monitoring to be performed in a subframe timing (or type) on which the number of resource elements (REs) usable for transmitting the EPDCCH is insufficient. Moreover, a base station can inform a UE of information on a type (or timing) of a specific subframe in which the legacy PDCCH-based CSS monitoring is performed via a predetermined signal (e.g., an upper layer or a physical layer signal). Or, the information can be determined based on an implicit rule (shared with each other between the base station and the UE in advance).

When the base station informs the UE of the information on the time-resource position in which the EPDCCH-based CSS monitoring is performed via the predetermined signal (e.g., an upper layer or a physical layer signal), if timing of the specific subframe type, which is exceptionally configured to the UE to perform the legacy PDCCH-based CSS monitoring, and a time-resource position, which is indicated to perform EPDCCH-based CSS monitoring (derived from information received from the base station), are overlapped with each other, it is able to configure (e.g., the UE may consider that the base station misconfigures information on the time-resource position in which the EPDCCH-based CSS monitoring is performed) the UE to preferentially perform the legacy PDCCH-based CSS monitoring in the subframe (type) of the corresponding timing.

In addition, when the base station informs the UE of the information on the time-resource position in which the EPDCCH-based CSS monitoring is performed via the predetermined signal (e.g., an upper layer or a physical layer signal), if timing of the specific subframe type, which is exceptionally configured to the UE to perform the legacy PDCCH-based CSS monitoring, and a time-resource position, which is indicated to perform EPDCCH-based CSS monitoring (derived from information received from the base station), are overlapped with each other, a specific RNTI type-based signal is received via PDCCH-based CSS monitoring based on a priority rule for a predetermined RNTI type and a predefined further different (remaining) specific RNTI type-based signal can be configured to be received via EPDCCH-based CSS monitoring. For instance, the specific RNTI type-based signal corresponding to at least one selected from the group consisting of a paging signal (P-RNTI), a system information signal (e.g., SIB, SI-RNTI), a multicasting signal (e.g., MCCH, M-RNTI), and a random access procedure-related signal (RA-RNTI) is received via the PDCCH-based CSS monitoring and a predetermined further different (or remaining) specific RNTI type-based signal can be configured to be received via the EPDCCH-based CSS monitoring. In this case, if timing of the legacy PDCCH-based CSS monitoring and timing of the EPDCCH-based CSS monitoring are overlapped with each other, it may be interpreted as the base station (and/or the UE) prefers EPDCCH-based communication on the corresponding timing. Hence, in order to prevent this, it may be able to configure (predetermined) specific RNTI type-based signals to be received based on the EPDCCH-based CSS monitoring or the legacy PDCCH-based CSS monitoring (in a manner of being divided).

Moreover, a base station can inform a UE of information on the specific RNTI type-based signals received via the legacy PDCCH-based CSS monitoring or the EPDCCH-based CSS monitoring via a predetermined signal (e.g., an upper layer or a physical layer signal). Or, the information can be configured to be determined based on an implicit rule (shared with each other between the base station and the UE in advance). The aforementioned embodiment of the present invention can also be applied to a case that the timing of the legacy PDCCH-based CSS monitoring and the timing of the EPDCCH-based CSS monitoring are not overlapped with each other (e.g., in case that the legacy PDCCH-based CSS and the EPDCCH-based CSS are intentionally configured to be monitored together on specific timing).

As an additional method, when timing of legacy PDCCH-based CSS monitoring and timing of EPDCCH-based CSS monitoring are overlapped with each other, it is able to configure an operation of receiving a predetermined specific DCI format (based on a priority rule for a DCI format type) to be performed via PDCCH-based CSS monitoring and configure an operation of receiving a predetermined further different (or remaining) specific DCI format type to be performed via EPDCCH-based CSS monitoring. For instance, if the operation of receiving the predetermined specific DCI format is performed via the PDCCH-based CSS monitoring, an operation of receiving a (temporary C-RNTI based) uplink DCI format 0 (i.e., if a part or all procedures of newly defined random access requires EPDCCH-based CSS/USS monitoring) can be configured to be performed via the EPDCCH-based CSS monitoring. In this case, a base station can inform a UE of information on a specific DCI format type received via the legacy PDCCH-based CSS monitoring or the EPDCCH-based CSS monitoring via a predetermined signal (e.g., an upper layer or a physical layer signal). Or, the information can be configured to be determined based on an implicit rule (shared with each other between the base station and the UE in advance). The aforementioned embodiment of the present invention can also be applied to a case that the timing of the legacy PDCCH-based CSS monitoring and the timing of the EPDCCH-based CSS monitoring are not overlapped with each other (e.g., in case that the legacy PDCCH-based CSS and the EPDCCH-based CSS are intentionally configured to be monitored together on specific timing).

In addition, if the timing of the legacy PDCCH-based CSS monitoring and the timing of the EPDCCH-based CSS monitoring are overlapped with each other, it is able to assume that a type (or a specific DCI format type) of a signal based on a specific RNTI type, which should be received based on an operation of a legacy PDCCH-based CSS monitoring or an operation of an EPDCCH-based CSS monitoring, is independently determined based on a predetermined rule. In this case, a base station can inform a UE of information on the type of the signal based on the specific RNTI type (or specific DCI format type) received via the legacy PDCCH-based CSS monitoring or the EPDCCH-based CSS monitoring interlocked with a specific transmission mode configuration type via a predetermined signal (e.g., an upper layer or a physical layer signal). Or, the information can be configured to be determined based on an implicit rule (shared with each other between the base station and the UE in advance).

Similarly, if the timing of the legacy PDCCH-based CSS monitoring and the timing of the EPDCCH-based CSS monitoring are overlapped with each other, embodiments of the present invention can be applied in a manner of being expanded based on criteria including whether a size of a system bandwidth of a wireless system exceeds a threshold value, a type of a cyclic prefix (CP), a type of a special subframe, whether a system corresponds to TDD or FDD, a type of transmitting EPDCCH (i.e., whether EPDCCH corresponds to localized EPDCCH or distributed EPDCCH), whether the number of resource elements (REs) usable for transmitting EPDCCH exceeds a threshold value and the like.

The aforementioned embodiment of the present invention can also be applied to a case that the timing of the legacy PDCCH-based CSS monitoring and the timing of the EPDCCH-based CSS monitoring are not overlapped with each other (e.g., in case that the legacy PDCCH-based CSS and the EPDCCH-based CSS are intentionally configured to be monitored together on specific timing).

In addition, in the aforementioned embodiment of the present invention, while maintaining the number (e.g., the number can be identically configured by the number of total PDCCH candidates defined in a CSS of a legacy Rel-10 system) of total candidates in a predetermined CSS as it is, it is able to configure to perform separation of the number of candidates according to an aggregation level (AL) between a CSS of a legacy PDCCH and a CSS of an EPDCCH according to a predetermined rule. Moreover, a base station can inform a UE of information on the total candidates in a CSS, information on the number of candidates according to an aggregation level (AL) in the CSS and information on a configuration for separating the number of candidates according to an aggregation level (AL) between the CSS of the legacy PDCCH and the CSS of the EPDCCH via a predetermined signal (e.g., an upper layer or a physical layer signal). Or, the information can be configured to be determined based on an implicit rule (shared with each other between the base station and the UE in advance).

As a different embodiment of the present invention, it may be able to exceptionally configure PDCCH-based CSS monitoring to be performed on a subframe timing (or type) on which a predetermined specific signal is received or a subframe timing (or type) on which a predetermined specific RNTI type-based signal decoding is required. In this case, as an embodiment, the predetermined specific signal (or the predetermined specific RNTI type) can be configured by at least one selected from the group consisting of a paging signal, a broadcasting signal (e.g., PBCH), a system information signal (e.g., SIB), a multicasting signal (e.g., MCCH), a random access procedure-related signal and a synchronization signal (e.g., PSS/SSS). Or, the predetermined specific signal (or the predetermined specific RNTI type) can be configured by at least one selected from the group consisting of a P-RNTI, an SI-RNTI, an M-RNTI and an RA-RNTI. Moreover, a base station can inform a UE of information on subframe timing (or type) on which a predetermined specific signal is received to perform legacy PDCCH-based CSS monitoring or information on a type of the predetermined specific signal via a predetermined signal (e.g., an upper layer or a physical layer signal). Or, the information can be configured to be determined based on an implicit rule (shared with each other between the base station and the UE in advance). Similarly, the base station can inform the UE of information on a subframe timing (or type) requiring a predetermined specific RNTI type-based signal decoding, information on a signal type based on a predetermined specific RNTI type and information on a predetermined specific RNTI type via a predetermined signal (e.g., an upper layer or a physical layer signal). Or, the information can be configured to be determined based on an implicit rule (shared with each other between the base station and the UE in advance).

As an additional proposed method, since whether to receive an MCCH-related signal and whether to perform an MCCH-related operation vary according to a version or capability of a UE, a base station can make legacy PDCCH-based CSS monitoring to be performed on a subframe timing (or type) on which an MCCH operation is applied in a manner of transmitting a signal (e.g., an upper layer or a physical layer signal) additionally defined for UEs incapable of receiving the MCCH-related signal or performing the MCCH-related operation in consideration of the version or the capability of the UE.

As a different embodiment of the present invention, it is able to configure a base station to inform a UE of information on a time-resource position in which both EPDCCH-based CSS monitoring and PDCCH-based CSS monitoring are performed via a predetermined signal (e.g., an upper layer or a physical layer signal). For instance, while maintaining the number (e.g., the number can be identically configured by the number of total PDCCH candidates defined in a CSS of a legacy Rel-10 system) of total candidates in a predetermined CSS as it is, it is able to configure to perform separation of the number of candidates according to an aggregation level (AL) between a CSS of a legacy PDCCH and a CSS of an EPDCCH according to a predetermined rule. Moreover, a base station can inform a UE of information on the total candidates in a CSS, information on the number of candidates according to an aggregation level (AL) in the CSS and information on a rule for separating the number of candidates according to an aggregation level (AL) between the CSS of the legacy PDCCH and the CSS of the EPDCCH via a predetermined signal (e.g., an upper layer or a physical layer signal). Or, the information can be configured to be determined based on an implicit rule (shared with each other between the base station and the UE in advance).

As a further different embodiment of the present invention, when a base station informs a UE of information on a position of a starting symbol of a specific EPDCCH set via a predetermined signal (e.g., an upper layer or a physical layer signal), it is able to configure EPDCCH-based CSS monitoring to be performed in subframes of specific timing by comparing information related to the position of the starting symbol of the EPDCCH set and legacy PDCCH region configuration information (e.g., PCFICH) with each other. Similarly, it is able to configure EPDCCH-based CSS monitoring to be performed in subframes of specific timing by comparing one of (minimum) legacy PDCCH region configuration information, which is required due to configuration of the number of OFDM symbols for PHICH transmission or PHICH duration configuration, with information on a position of a starting symbol of a specific EPDCCH set. For instance, if a starting symbol position of an EPDCCH set is set to 0 or a first OFDM symbol of a subframe, a UE considers that legacy PDCCH transmission is not performed in corresponding subframes and the UE can be configured to perform EPDCCH-based CSS monitoring. Or, for instance, if a starting symbol position of an EPDCCH set is set to a first OFDM symbol of a subframe, the UE considers that a CSS does not exist in a PDCCH region in corresponding subframes or a monitoring (or blind decoding) operation is omitted for the CSS in the PDCCH region and the UE can be configured to perform EPDCCH-based CSS monitoring.

As a further different embodiment of the present invention, when a PHICH duration type is configured as extended PHICH duration via a predetermined signal (e.g., PBCH), a CSS monitoring operation is explained in the following in case that the (minimum) number of OFDM symbols used for transmitting PDCCH is assumable as constant.

For instance, when a PHICH duration type is configured as extended PHICH duration, although the (minimum) number of OFDM symbols used for transmitting PDCCH should be set to 2 (i.e., $2^{nd}$ and $7^{th}$ subframe (SF #1, SF #6) of a TDD radio frame as a non-MBSF SF or an MBSF subframe (on a carrier supporting PDSCH) or 3 (i.e., all non-MBSF SFs (except $2^{nd}$ and $7^{th}$ subframe (i.e., SF #1, SF #6) of a TDD radio frame) all the time, if a start symbol position of an EPDCCH set is configured to precede the (minimum) number (or region) of OFDM symbols used for transmitting PDCCH required in each case (i.e., if a region of (minimum) OFDM symbols used for transmitting PDCCH and a start OFDM symbol position of an EPDCCH set are configured to be overlapped with each other), a UE considers that legacy PDCCH transmission is not performed in the corresponding subframes, considers that a CSS does not exist in a PDCCH region, or considers that monitoring (or blind decoding) operation for a CSS is omitted in a PDCCH region. And, the UE can be configured to perform an EPDCCH-based CSS monitoring operation.

A base station informs a UE of information on rules, which determines whether to perform EPDCCH-based CSS monitoring based on comparison between information on a start symbol position of an EPDCCH set and legacy PDCCH region configuration information (e.g., PCFICH), via a predetermined signal (e.g., an upper layer or a physical layer signal). Or, the information can be configured to be determined based on an implicit rule (shared with each other between the base station and the UE in advance).

Or, a base station may inform a UE of information on rules, which determines whether to perform EPDCCH-based CSS monitoring, in a manner of comparing information on a start symbol position of an EPDCCH set with one of minimum legacy PDCCH region configuration information, which is required due to configuration of the number of OFDM symbols used for transmitting PHICH or PHICH duration configuration. Or, the information can be configured to be determined based on an implicit rule. According to the aforementioned embodiment of the present invention, the information on the start symbol position of the EPDCCH set can be extended to determine whether to perform EPDCCH-based USS monitoring by comparing the information with one of (minimum) legacy PDCCH region configuration information, which are required due to legacy PDCCH region configuration information (e.g., PCFICH), configuration of the number of OFDM symbols used for transmitting PHICH, or PHICH duration configuration.

Moreover, when blind decoding candidates (or aggregation levels or blind decoding candidates according to an aggregation level) for a USS monitored by a UE are configured in a legacy PDCCH region and an EPDCCH region in a manner of being separated from each other based on a predetermined rule, the aforementioned embodiment of the present invention can also be applied in a manner of being extended. In particular, when blind decoding candidates for a USS monitored by a UE are configured in a legacy PDCCH region and an EPDCCH region in a manner of being separated from each other, the aforementioned embodiment of the present invention can also be applied to a case that the UE monitors both the legacy PDCCH region and the EPDCCH region at the same time for blind decoding of the USS blind decoding candidates.

Specifically, if a start symbol position of an EPDCCH set is set to 0 (or a first OFDM symbol of a subframe), a UE considers that legacy PDCCH transmission is not performed in the corresponding subframes, considers that a USS does not exist in a PDCCH region, or considers that monitoring operation for a USS is omitted in a PDCCH region. And, the UE can be configured to perform an EPDCCH-based USS monitoring operation.

Or, when a PHICH duration type is configured as extended PHICH duration via a predetermined signal (e.g., PBCH), although the (minimum) number of OFDM symbols used for transmitting PDCCH should be set to 2 (i.e., $2^{nd}$ and $7^{th}$ subframe (SF #1, SF #6) of a TDD radio frame as a non-MBSF SF or an MBSF subframe (on a carrier supporting PDSCH) or 3 (i.e., all non-MB SF SFs (except $2^{nd}$ and $7^{th}$ subframe (i.e., SF #1, SF #6) of a TDD radio frame) all the time, if a start symbol position of an EPDCCH set is configured to precede the (minimum) number (or region) of OFDM symbols used for transmitting PDCCH required in each case (i.e., if a region of (minimum) OFDM symbols used for transmitting PDCCH and a start OFDM symbol position of an EPDCCH set are configured to be overlapped with each other), a UE considers that legacy PDCCH transmission is not performed in the corresponding subframes, considers that a USS does not exist in a PDCCH region, or considers that monitoring operation for a USS is omitted in a PDCCH region. And, the UE can be configured to perform an EPDCCH-based USS monitoring operation.

In addition, according to the present invention, if blind decoding candidates (or aggregation levels or a blind decoding candidate according to an aggregation level) for a USS (monitored by a UE) are configured in a legacy PDCCH region and an EPDCCH region in a manner of being separated from each other and a monitoring (or blind decoding) operation for a USS blind decoding candidate is omitted, the blind decoding candidates (or aggregation levels or a blind decoding candidate according to an aggregation level) of the omitted PDCCH region can be reallocated (or moved) to the blind decoding candidates (or aggregation levels or a blind decoding candidate according to an aggregation level) of the EPDCCH region.

In particular, if a monitoring (or blind decoding) operation for the USS blind decoding candidate of the PDCCH region is omitted, a UE performs EPDCCH-based USS monitoring operation in consideration of the blind decoding candidate (or aggregation levels or a blind decoding candidate according to an aggregation level) of the PDCCH region and the blind decoding candidate (or aggregation levels or a blind decoding candidate according to an aggregation level) of the EPDCCH region. Moreover, a base station can inform a UE of information on a rule, which determines whether to perform EPDCCH-based USS monitoring by comparing information on a start symbol position of an EPDCCH set with legacy PDCCH region configuration information (e.g., PCFICH) (or configuration of the number of OFDM symbols used for transmitting PHICH or (minimum) legacy PDCCH region configuration information required due to PHICH duration configuration) or information on a rule, which reallocates (or moves) a blind decoding candidate (or aggregation levels or a blind decoding candidate according to an aggregation level) of an (omitted) PDCCH region to a blind decoding candidate (or aggregation levels or a blind decoding candidate according to an aggregation level) of an EPDCCH region in case that a monitoring (or blind decoding) operation for a USS blind decoding candidate of the PDCCH region is omitted, via a predetermined signal (e.g., an upper layer or a physical layer signal). Or, the information can be configured to be determined based on an implicit rule (shared with each other between the base station and the UE in advance).

The PDCCH region and the EPDCCH region in which the USS/CSS blind decoding candidate is monitored by a UE may exist in cells (or component carriers) different from each other, respectively. And, all embodiments of the present invention can also be applied to a situation that the PDCCH region and the EPDCCH region in which the USS/CSS blind decoding candidate is monitored exist in cells (or component carriers) different from each other, respectively.

And, the proposed schemes can also be applied to a subframe in which both a CSS of PDCCH and a CSS of EPDCCH are monitored at the same time.

According to the aforementioned embodiments of the present invention, in a situation that at least one or more CSS EPDCCH sets are configured (by a base station), information on a position of a resource (e.g., time-resource and/or frequency resource) in which EPDCCH-based CSS monitoring (or PDCCH-based CSS monitoring) is performed can be configured to be determined by at least one selected from the group consisting of combination information of the number of PRB pairs constructing each CSS EPDCCH set, system bandwidth information, combination information (e.g., localized or distributed EPDCCH set) of EPDCCH transmission type of each CSS EPDCCH set, information on uplink/downlink DCI format type monitored by a UE in a CSS EPDCCH set and/or combination information of uplink/downlink DCI format type monitored by a UE in each CSS EPDCCH set. Moreover, a base station can inform a UE of information related to the aforementioned operation via a predetermined signal (e.g., an upper layer or a physical layer signal). Or, the information can be configured to be determined based on an implicit rule (shared with each other between the base station and the UE in advance).

Each of the aforementioned various embodiments of the present invention can be independently implemented. Yet, although a part of at least one or more embodiments of the aforementioned present invention is implemented in a manner of being combined with each other or all of the embodiments are implemented in a manner of being combined with each other, it is apparent that the implementation belongs to a scope of the technical solution proposed by the present invention.

Figure 12:
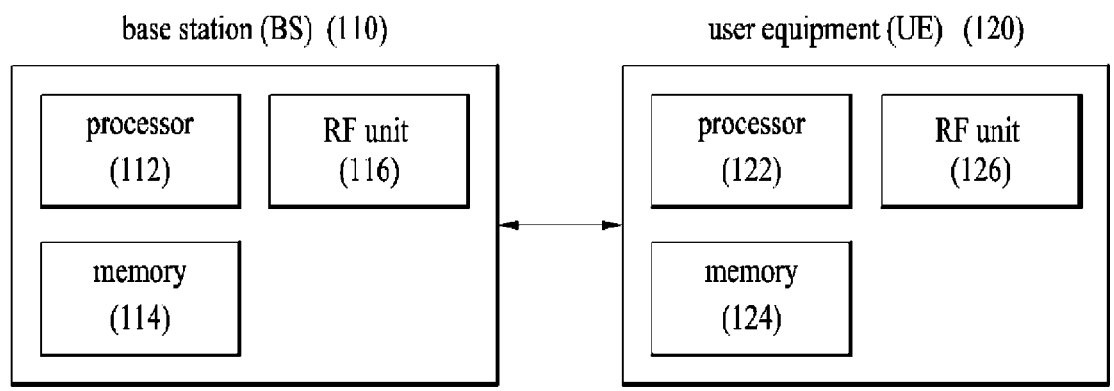
FIG. 12 is a diagram for an example of a base station and a user equipment applicable to an embodiment of the present invention.

FIG. 12 is a diagram for an example of a base station and a user equipment applicable to embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation Referring to FIG. 12, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of receiving control information in a wireless communication system and apparatus therefor are described centering on examples applied to 3GPP LTE system, it may be applicable to various kinds of wireless communication systems as well as to the 3GPP LTE system.

What is claimed is:

1. A method of receiving control information by a user equipment (UE) in a wireless communication system, the method comprising:
receiving information on a time-resource region in which common search space (CSS) monitoring on a legacy physical downlink control channel (PDCCH) is performed;
receiving monitoring information on a CSS on an enhanced PDCCH (EPDCCH); and
detecting control information according to the monitoring information,
wherein if the time-resource region in which the CSS monitoring on the legacy PDCCH is performed is identical to the time-resource region in which CSS monitoring on the EPDCCH is performed, the control information is detected by monitoring a CSS determined according to a transmission mode of the UE.

2. The method of claim 1, wherein the monitoring information comprises an indicator indicating whether a time-resource region exists in the CSS on the EPDCCH.

3. The method of claim 1, wherein the monitoring information comprises information indicating a system version related to the wireless communication system, and
wherein the control information is detected by monitoring the CSS on the EPDCCH only when the system version corresponds to a predetermined system version.

4. The method of claim 1, wherein the monitoring information indicates a number of resource elements (REs) usable for transmitting the EPDCCH, and
wherein the control information is detected by monitoring the CSS on the EPDCCH only when the number of REs is greater than a predetermined number.

5. The method of claim 1, wherein if the time-resource region in which the CSS monitoring on the legacy PDCCH is performed is identical to the time-resource region in which the CSS monitoring on the EPDCCH is performed, the time-resource region for the CSS monitoring on the EPDCCH is considered as a misconfigured state.

6. The method of claim 1, wherein the monitoring information further comprises information on a time-resource region in which both EPDCCH-based CSS monitoring and legacy PDCCH-based CSS monitoring are performed together.

7. The method of claim 1, further comprising the step of receiving information on a starting symbol position of a specific EPDCCH set.

8. The method of claim 7, wherein if the starting symbol position of the specific EPDCCH set and a legacy PDCCH region set to the UE user equipment are overlapped with each other, the control information is detected by monitoring detecting step monitors the CSS on the EPDCCH.

9. The method of claim 1, wherein if blind decoding candidates for a UE-specific search space (USS) on the legacy PDCCH and blind decoding candidates for a USS on the EPDCCH are respectively configured and USS monitoring on the legacy PDCCH is omitted, the blind decoding candidates for the USS on the legacy PDCCH are reallocated to the blind decoding candidates for the USS on the EPDCCH.

10. The method of claim 1, wherein size of the CSS monitoring on the PDCCH is determined according to a number of orthogonal frequency division multiplexing (OFDM) symbols used for the PDCCH, wherein the number of OFDM symbols used for the PDCCH is equal to physical hybrid automatic repeat request (HARQ) indicator channel (PHICH) duration, if extended PHICH duration is indicated by higher layers.

11. The method of claim 10, wherein a starting symbol position of a specific EPDCCH set is given according to the number of OFDM symbols used for the PDCCH.

12. A user equipment (UE) for receiving control information in a wireless communication system, the UE comprising:
a radio frequency (RF) an RF (radio frequency) unit; and
a processor configured to:
receive, via the RF unit, information on a time-resource region in which common search space (CSS) monitoring on a legacy physical downlink control channel (PDCCH) is performed,
receive, via the RF unit, monitoring information on a CSS on an enhanced PDCCH (EPDCCH), and
detect control information according to the monitoring information,
wherein if the time-resource region in which the CSS monitoring on the legacy PDCCH is performed is identical to the time-resource region in which CSS monitoring on the EPDCCH is performed, the control information is detected by monitoring a CSS determined according to a transmission mode of the UE.

\* \* \* \* \*